United States Patent
Lagorgette et al.

(10) Patent No.: US 11,183,952 B2
(45) Date of Patent: Nov. 23, 2021

(54) ROTATING PIEZOELECTRIC MOTOR WITH RADIAL PRELOAD

(71) Applicant: ETA SA Manufacture Horlogere Suisse, Grenchen (CH)

(72) Inventors: Pascal Lagorgette, Bienne (CH); Pascal Meyer, Neuchatel (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 367 days.

(21) Appl. No.: 16/275,364

(22) Filed: Feb. 14, 2019

(65) Prior Publication Data

US 2019/0280625 A1 Sep. 12, 2019

(30) Foreign Application Priority Data

Mar. 9, 2018 (EP) .................................... 18160979

(51) Int. Cl.
*H02N 2/10* (2006.01)
*G04C 3/12* (2006.01)
*H02N 2/00* (2006.01)

(52) U.S. Cl.
CPC ............... *H02N 2/103* (2013.01); *G04C 3/12* (2013.01); *H02N 2/001* (2013.01); *H02N 2/006* (2013.01); *H02N 2/0055* (2013.01)

(58) Field of Classification Search
CPC ...... H02N 2/103; H02N 2/0055; H02N 2/001; H02N 2/006; H02N 2/12; G04C 3/12
See application file for complete search history.

(56) References Cited

U.S. PATENT DOCUMENTS

| 7,429,812 B2 * | 9/2008 | Witteveen ............... G02B 7/005 310/323.01 |
| 2003/0052575 A1 | 3/2003 | Mock et al. |
| 2004/0212278 A1 | 10/2004 | Miyazawa |

(Continued)

FOREIGN PATENT DOCUMENTS

| CN | 101019301 A | 8/2007 |
| CN | 107070300 A | 8/2017 |
| JP | 2004-260990 A | 9/2004 |

(Continued)

OTHER PUBLICATIONS

European Search Report dated Sep. 17, 2018 in European Application 18160979.3, filed on Mar. 9, 2018 (with English Translation of Categories of Cited Documents).

(Continued)

*Primary Examiner* — Emily P Pham
(74) *Attorney, Agent, or Firm* — Oblon, McClelland, Maier & Neustadt, L.L.P.

(57) ABSTRACT

A rotating piezoelectric motor including a piezoelectric actuator including a resonator having a pair of arms connected at one of their ends in a connection area, the other two ends being referred to as 'free', a passive element including a cylindrical part extending orthogonally to the resonator, the cylindrical part being able to be rotated by the friction of the free ends of the arms on the cylindrical part, each free end including a protuberance such that the protuberances extend towards one another and together form a housing for a portion of the cylindrical part, the motor including a device for holding the portion of the cylindrical part inside the housing.

11 Claims, 1 Drawing Sheet

(56) References Cited

U.S. PATENT DOCUMENTS

2007/0164635 A1 7/2007 Witteveen et al.
2016/0226401 A1 8/2016 Arakawa et al.

FOREIGN PATENT DOCUMENTS

| JP | 2007-37242 A | 2/2007 |
| JP | 2007-189802 A | 7/2007 |
| JP | 2013-59142 | 3/2013 |
| JP | 2016-144268 A | 8/2016 |
| JP | 2016-178806 A | 10/2016 |

OTHER PUBLICATIONS

Combined Chinese Office Action and Search Report dated Jun. 22, 2020 in Chinese Application 201910174783.8 (with English Translation), 14 pages.
Japanese Office Action dated May 7, 2020 in Japanese Application 2019-024298 (submitting English translation only), 5 pages.
Korean Office Action dated Oct. 26, 2020 in Korean Patent Application No. 10-2019-0027110 (with English translation), 6 pages.
Chinese Office Action dated Dec. 8, 2020, in Chinese Patent Application No. 201910174783.8 (with English translation), 12 pages.
Korean Office Action dated Dec. 21, 2020 in Korean Patent Application No. 10-2019-0027110 (with English translation), 6 pages.

\* cited by examiner

ROTATING PIEZOELECTRIC MOTOR WITH RADIAL PRELOAD

CROSS-REFERENCE TO RELATED APPLICATION

This application claims priority to European Patent Application No. 18160979.3 filed on Mar. 9, 2018, the entire disclosure of which is hereby incorporated herein by reference.

FIELD OF THE INVENTION

The invention relates to the technical field of rotating piezoelectric motors.

BACKGROUND OF THE INVENTION

A rotating piezoelectric motor conventionally has a passive element and an actuator for rotating the passive element using the piezoelectric effect. Referring to FIG. 1, there are known, in particular, rotating piezoelectric motors 10 in which the passive element includes a cylinder 20 and the piezoelectric actuator comprises a resonator 30 formed of a pair of arms 31, 32 connected to each other in a substantially tuning fork-shaped or U-shaped connection area 33. The piezoelectric actuator further includes two piezoelectric elements (not represented), each attached to one of arms 31, 32, and acting as excitation means for the arms to impart vibrations thereto. Passive element 20 passes between arms 31, 32 of resonator 30. More specifically, one area of the lateral surface of passive element 20 is in contact, on both sides, with the free ends 310, 320 of arms 31, 32, so that passive element 20 is rotated by the friction of free ends 310, 320 of arms 31, 32 on the contact area.

A motor of this type must be preloaded at the interface between the resonator and the cylindrical part, in order to set the holding torque without powering the motor, i.e. without exciting the arms.

SUMMARY OF THE INVENTION

It is an object of the present invention to propose a rotating piezoelectric motor fitted with a preload system.

To this end, the invention relates to a rotating piezoelectric including:
  a piezoelectric actuator comprising a resonator having a pair of arms connected at one of their ends in a connection area, the other two ends being referred to as 'free',
  a passive element including a cylindrical part extending orthogonally to the resonator, the cylindrical part being able to be rotated by the friction of the free ends of the arms on the cylindrical part,
each free end including a protuberance such that the protuberances extend towards one another and together form a housing for a portion of the cylindrical part,
the motor including a device for holding the portion of the cylindrical part inside the housing.

A 'protuberance' means an element which forms a raised portion, which projects, an extending portion.

According to the invention, a radial preload is created between the cylindrical part and the resonator: a radial force is generated by means of the holding device for holding the cylindrical part against the protuberances found at each end of the resonator arms. The term 'radial' refers to a radius of the cylindrical part.

The preload system is therefore formed of the protuberances and the holding device.

In a first embodiment, the holding device is able to generate an elastic force on the portion of the cylindrical part. For example, the holding device includes a securing element and an elastic element, for example a spring, a strip or a rubber element, fixed to the securing element on the one hand, and bearing on the portion of the cylindrical part on the other.

In a second embodiment, the holding device is able to generate a magnetic force on the portion of the cylindrical part. For example, the holding device includes a magnet fixed to the arm connection area, and the portion of the cylindrical part includes a magnetic material, for example a ferromagnetic material, so as to create a force of attraction between the portion of the cylindrical part and the magnet. It is noted that one advantage of the second embodiment of the invention compared to the first is that the preload system is self-supporting. Another advantage is that the cylindrical part can rotate freely without being subjected to friction from contact with the elastic element.

In one embodiment, the holding device is able to generate a force substantially parallel to the resonator arms. In the case where the holding device includes an elastic element such as a spring, then the axis of said elastic element is substantially parallel to the resonator arms. In the case where the holding device includes a magnet, then said magnet is arranged at a substantially equal distance from the free ends of the arms.

The invention also relates to a timepiece including a piezoelectric motor as detailed above.

In a non-limiting embodiment, the timepiece includes a hand fixed to one end of the cylindrical part.

BRIEF DESCRIPTION OF THE DRAWINGS

Other features and advantages will appear clearly from the following description, given by way of non-limiting illustration, with reference to the annexed drawings, in which.

DETAILED DESCRIPTION OF PREFERRED EMBODIMENTS

Figure 1:
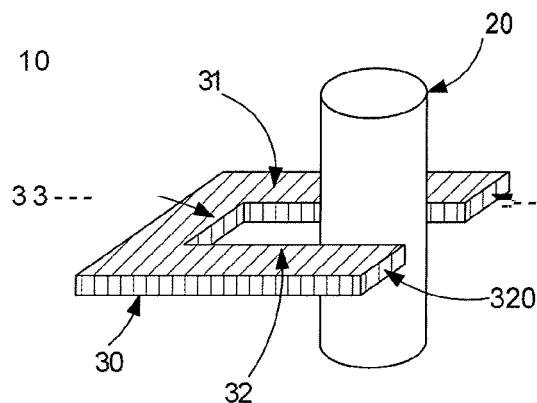
FIG. 1, already described, schematically represents a side view of one part of a rotating piezoelectric motor according to the prior art.
Figure 2:
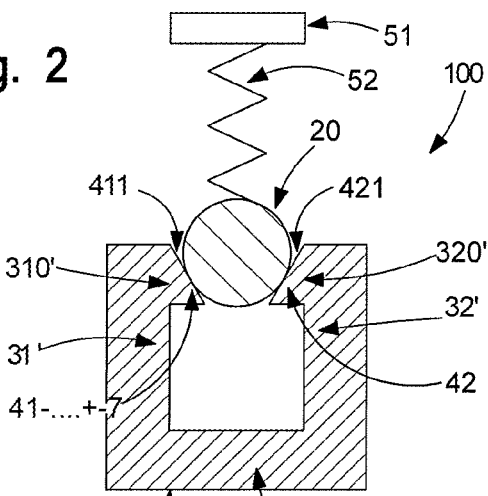
FIG. 2 schematically represents a part of a rotating piezoelectric motor according to a first embodiment of the invention, seen from above, FIG. 3 schematically represents a side view of the part of the rotating piezoelectric motor of FIG. 2, FIG. 4 schematically represents a top view of a part of a rotating piezoelectric motor according to a second embodiment of the invention, FIG. 5 schematically represents a top view of a part of a rotating piezoelectric motor according to a third embodiment of the invention, FIG. 6 schematically represents a part of a timepiece including the rotating piezoelectric motor of FIG. 4 and a hand fixed to said motor.
Figure 3:
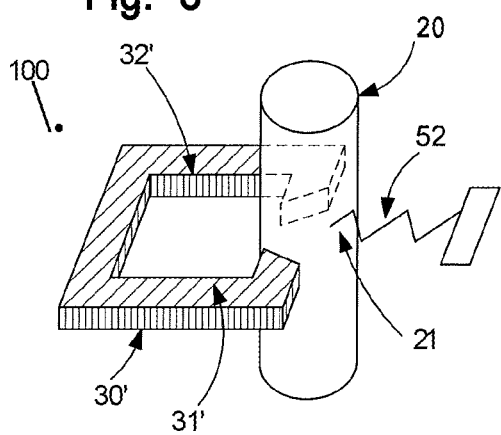
Figure 4:
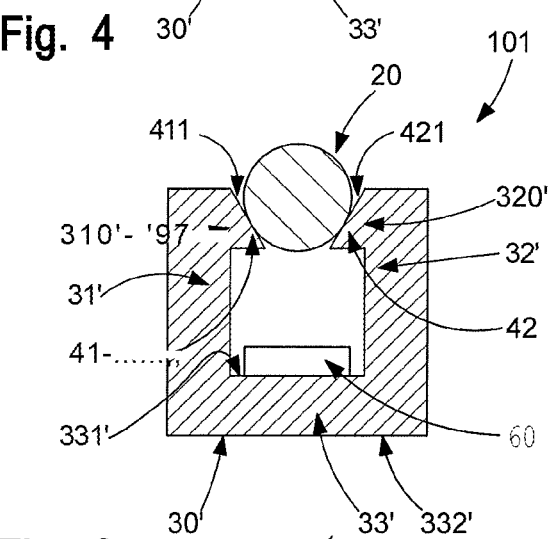
Figure 5:
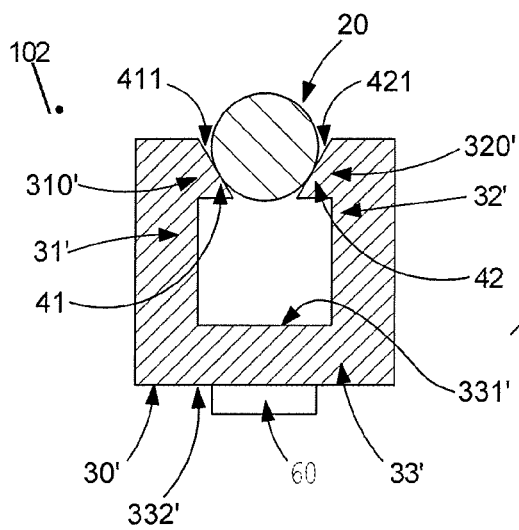

FIGS. 2 and 3 show a part of a piezoelectric motor 100 according to a first embodiment of the invention, FIG. 4 shows a piezoelectric motor 101 according to a second embodiment of the invention, and FIG. 5 shows a piezoelectric motor 102 according to a third embodiment of the invention. In all three cases, motor 100, 101, 102 includes a passive element including a cylindrical part 20, and a piezoelectric actuator for rotating cylindrical part 20 using the piezoelectric effect.

The piezoelectric actuator includes piezoelectric excitation means (not represented) and a resonator 30' including two arms 31', 32' able to oscillate. The excitation means are advantageously formed of two parts, each attached to a different arm. However, other embodiments of the excitation means are possible; they may, for example, be formed of a single part arranged at a joint between the arms. When a suitable voltage is applied to the excitation means, the excitation means deform, and mechanical stresses are transmitted to arms 31', 32', which then start to oscillate. If the excitation means are designed and mounted in a suitable manner on the arms, multi-dimensional oscillations of the desired form can be achieved.

Arms 31', 32' are connected in a connection area 33', and extend substantially parallel to each other from said connection area 33'. The resonator is therefore generally tuning fork-shaped, i.e. U-shaped. However, this shape is not limiting. The ends of the arms that are not connected to connection area 33', are referred to as free ends 310', 320'. The amplitude of the oscillations of arms 31', 32' is maximum at these ends 310', 320'.

Cylindrical part 20 extends substantially orthogonally to resonator 30', i.e. orthogonally to the plane containing the axes of arms 31', 32' of resonator 30', and is in contact with the two free ends 310', 320'. The multi-dimensional oscillations of free ends 310', 320' of arms 31', 32' make it possible to impart a rotation to cylindrical part 20 about its axis by the friction of said ends 310', 320' against said cylindrical part 20.

The free ends 310', 320' have a particular geometry which, combined with a holding device of the piezoelectric motor described below, allows preloading to be created between resonator 30' and cylindrical part 20. More precisely, each free end 310', 320' includes a protuberance 41, 42, such that protuberances 41, 42 extend towards one another. Each protuberance 41, 42 has an inclined surface 411, 421, so as to form a housing with each other. Cylindrical part 20 is in contact with the inclined surfaces 411, 421 of these protuberances 41, 42. In other words, one portion 21 of cylindrical part 20 (visible in FIG. 3) is wedged inside the housing formed by inclined surfaces 411, 421. The holding force makes it possible to apply a pressure force to said portion 21, in a parallel direction to arms 31', 32', and towards connection area 33', so that portion 21 bears on these inclined surfaces 411, 421.

In the first embodiment, the holding device includes an elastic element, here a spring 52, and a stop 51. Spring 52 is such that it bears on portion 21 on one side and on stop 51 on the other side, so as to push cylindrical part 20 against inclined surfaces 411, 421.

In the second and third embodiments, the holding device includes a magnet 60 positioned on the side of connection area 33', and portion 21 includes a magnetic material, for example a ferromagnetic material, so as to attract portion 21 towards magnet 60, and consequently against inclined surfaces 411, 421. In the second embodiment, magnet 60 is fixed to an inner face 331 of connection area 33', whereas in the third embodiment, magnet 60 is fixed to an outer face 332' of connection area 33'. Inner face 331' is the face located opposite cylindrical part 20 and outer face 332' is the face opposite inner face 331'.

Figure 6:
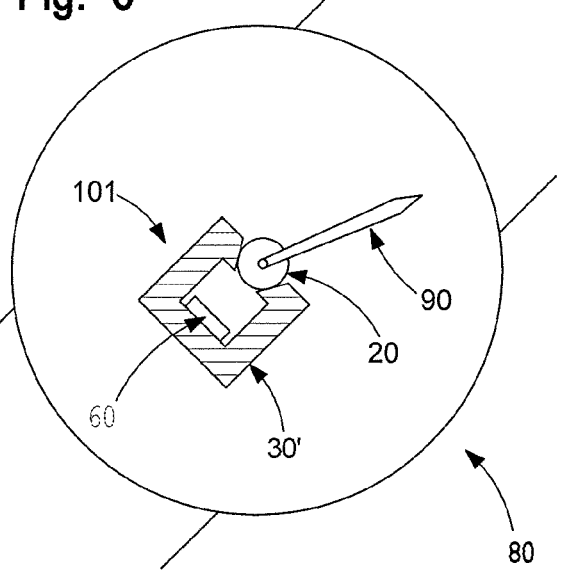

Finally, FIG. 6 shows a timepiece 80 of the wristwatch type, including a hand 90 fixed to the upper end of cylindrical part 20 of piezoelectric motor 101 according to the second embodiment. However, the piezoelectric motor according to one of the embodiments of the invention could be used to drive in rotation not a hand, but a disc (for example a date disc or a moon phase disc), a wheel or a ring.

It will be clear that various modifications and/or improvements and/or combinations evident to those skilled in the art may be made to the various embodiments of the invention set out above without departing from the scope of the invention defined by the annexed claims. For example, the inclined surfaces 411, 421 were represented as being flat in the illustrated embodiments, but they could equally be concave or convex. The essential point is that these surfaces are held in contact with portion 21 of cylindrical part 20.

The invention claimed is:

1. A rotating piezoelectric motor comprising:
   a piezoelectric actuator comprising a resonator having a pair of arms connected at one of their ends in a connection area, the other two ends being referred to as 'free',
   a passive element including a cylindrical part extending orthogonally to the resonator, the cylindrical part being able to be rotated by the friction of the free ends of the arms on the cylindrical part,
   each free end including a protuberance such that the protuberances extend towards one another and together form a housing for a portion of the cylindrical part,
   the rotating piezoelectric motor including a device for holding the portion of the cylindrical part inside the housing and generating a force on the passive element in a direction from the free end towards the one end of one of the arms.

2. The rotating piezoelectric motor according to claim 1, wherein the holding device is able to generate an elastic force on the portion of the cylindrical part.

3. A timepiece comprising the rotating piezoelectric motor according to claim 1.

4. The timepiece according to claim 3, further comprising a hand fixed to one end of the cylindrical part.

5. The rotating piezoelectric motor according to claim 1, comprising:
   a single piezoelectric actuator; and
   the device for holding the portion of the cylindrical part generating the force on the cylindrical part to hold the cylindrical part in position against the protuberances of the single piezoelectric actuator.

6. The rotating piezoelectric motor according to claim 1, wherein said cylindrical part is held in a position against the piezoelectric actuator only by said device.

7. A rotating piezoelectric motor according to claim 2, comprising:
   a piezoelectric actuator comprising a resonator having a pair of arms connected at one of their ends in a connection area, the other two ends being referred to as 'free',
   a passive element including a cylindrical part extending orthogonally to the resonator, the cylindrical part being able to be rotated by the friction of the free ends of the arms on the cylindrical part,
   each free end including a protuberance such that the protuberances extend towards one another and together form a housing for a portion of the cylindrical part,
   the rotating piezoelectric motor including a device for holding the portion of the cylindrical part inside the housing,
   wherein the holding device includes a securing element and an elastic element, fixed to the securing element on the one hand and bearing against the portion of the cylindrical part on the other.

8. The rotating piezoelectric motor according to claim 7, wherein the axis of said elastic element is substantially parallel to the arms of the resonator.

9. A rotating piezoelectric motor according to claim 1, comprising:
- a piezoelectric actuator comprising a resonator having a pair of arms connected at one of their ends in a connection area, the other two ends being referred to as 'free',
- a passive element including a cylindrical part extending orthogonally to the resonator, the cylindrical part being able to be rotated by the friction of the free ends of the arms on the cylindrical part,
- each free end including a protuberance such that the protuberances extend towards one another and together form a housing for a portion of the cylindrical part,
- the rotating piezoelectric motor including a device for holding the portion of the cylindrical part inside the housing,
- wherein the holding device is able to generate a magnetic force on the portion of the cylindrical part.

10. The rotating piezoelectric motor according to claim 9, wherein the holding device includes a magnet fixed to the connection area of the arms, and the portion of the cylindrical part includes a magnetic material, so as to create a force of attraction between the portion of the cylindrical part and the magnet.

11. The rotating piezoelectric motor according to claim 10, said magnet being arranged at a substantially equal distance from the free ends of the arms.

* * * * *